(12) United States Patent
McKeough

(10) Patent No.: US 7,588,134 B2
(45) Date of Patent: Sep. 15, 2009

(54) DEFORMABLE/INFLATABLE WEAR LINER

(75) Inventor: Wayne McKeough, Alcan Gove (AU)

(73) Assignee: Alcan International Limited, Montreal, Quebec (CA)

( * ) Notice: Subject to any disclaimer, the term of this patent is extended or adjusted under 35 U.S.C. 154(b) by 48 days.

(21) Appl. No.: 11/780,146

(22) Filed: Jul. 19, 2007

(65) Prior Publication Data

US 2009/0020391 A1 Jan. 22, 2009

(51) Int. Cl.
*B65G 11/16* (2006.01)
(52) U.S. Cl. .................... 193/25 B; 193/1; 193/2 R
(58) Field of Classification Search ............. 193/1, 193/2 R, 25 B
See application file for complete search history.

(56) References Cited

U.S. PATENT DOCUMENTS

| 200,694 | A | * | 2/1878 | Carpenter | 193/17 |
|---|---|---|---|---|---|
| 2,765,131 | A | * | 10/1956 | Boyle | 244/137.2 |
| 3,018,867 | A | * | 1/1962 | Heyniger | 193/25 B |
| 3,139,998 | A | * | 7/1964 | Seaman | 414/539 |
| 3,827,094 | A | * | 8/1974 | Fisher | 441/38 |
| 4,194,611 | A | | 3/1980 | Mukhin et al. | |
| 4,541,517 | A | * | 9/1985 | O'Reilly | 193/4 |
| 4,907,721 | A | | 3/1990 | Poncet | |
| 5,064,046 | A | * | 11/1991 | Janotik et al. | 193/35 SS |
| 5,551,759 | A | * | 9/1996 | Hoss et al. | 298/22 P |
| 5,562,369 | A | * | 10/1996 | Jones | 406/90 |
| 5,705,250 | A | | 1/1998 | Hudson, Jr. | |
| 5,967,254 | A | * | 10/1999 | Lutzer | 182/48 |
| 6,167,913 | B1 | * | 1/2001 | Wood et al. | 138/98 |
| 6,481,598 | B1 | * | 11/2002 | Thornsen | 222/105 |
| 6,675,734 | B2 | * | 1/2004 | Eagles et al. | 114/256 |
| 6,966,416 | B2 | * | 11/2005 | Walker | 193/35 A |

FOREIGN PATENT DOCUMENTS

| GB | 2107288 | 4/1983 |
|---|---|---|
| JP | 11278632 | 10/1999 |
| JP | 2002316707 | 10/2002 |

* cited by examiner

*Primary Examiner*—Douglas A Hess
(74) *Attorney, Agent, or Firm*—Ogilvy Renault

(57) ABSTRACT

A deformable/inflatable wear liner is attached to an inner surface of a wall of a granular material delivery passage. Pressurized air may be introduced into a space between the wall and the wear liner to inflate the wear liner, thereby preventing solids from building up in the passage.

19 Claims, 3 Drawing Sheets

DEFORMABLE/INFLATABLE WEAR LINER

TECHNICAL FIELD

The invention relates to a granular material delivery system, and more particularly to a chute having a deformable/inflatable wear liner.

BACKGROUND OF THE INVENTION

In many industrial applications such as mines, etc., it is necessary or desirable to move appreciable quantities of granular material from one location to another. A conveyor, usually a belt conveyor, is employed to transport the granular material such as bauxite ore, for example. Most of such conveyors have an input chute for delivering the granular material to the conveyor and a discharge chute for discharging the granular material at the output end of the conveyor. In both cases, the chute often includes a wear liner attached to the inner side of the chute wall. The chute wall may be made of steel plates and the wear liner may be made from various materials such as ceramic, stainless steel, rubber, plastic, etc. Such conventional chute wear liners may provide abrasive and impact resistance to the chute but are not successful in preventing granular material solids from building up in the transfer chutes of the material handling system. The material solids build-up can be particularly severe during periods of higher material moisture content. Material solids build-up can result in a complete blockage of the material flow through the chute and/or damage to the conveyor belt if the material build-up is not prevented or regularly removed.

Therefore, there is a need for a method and apparatus to prevent solids from building up in a granular material handling system during a material delivery operation.

SUMMARY OF THE INVENTION

In accordance with one aspect of the present invention, a method is provided for preventing solids from building up in a granular material delivery passage during a material delivery operation, the passage including at least a wall and a deferrable wear liner provided on an inner surface of the wall for directing granular materials sliding on the wear liner, the method comprising: a) introducing a pressurized fluid into a space between the inner surface of the wall and the deformable wear liner to deform the wear liner, thereby causing a profile change of a cross-section of the granular material delivery passage.

In accordance with another aspect of the present invention there is provided a chute for a material handling system bearing granular materials, the chute comprising: at least one wall; a deformable wear liner having a wear-resistant surface, the deformable wear liner being attached to at least a section of the wall of the chute so as to allow pressurized fluid to be introduced into a space between the deformable wear liner and the wall in order to inflate the deformable wear liner; and means for introducing and discharging the pressurized fluid into and from the space between the deformable wear liner and the wall, respectively.

In accordance with a further aspect of the present invention, there is provided a granular material handling system which comprises a chute including a chute wall and a deformable wear liner within the chute, the deformable wear liner being attached to an inner surface of a section of the chute wall so as to allow pressurized air to be introduced into a space between the wear liner and the chute wall in order to inflate the wear liner; a source of pressurized air; a tube connected between the source of pressurized air and the space between the chute wall and the wear liner for delivery of pressurized air to inflate the wear liner; and a control apparatus for controllably inflating the wear liner and discharging pressurized air from the space between the chute wall and the wear liner, respectively.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

Figure 1:
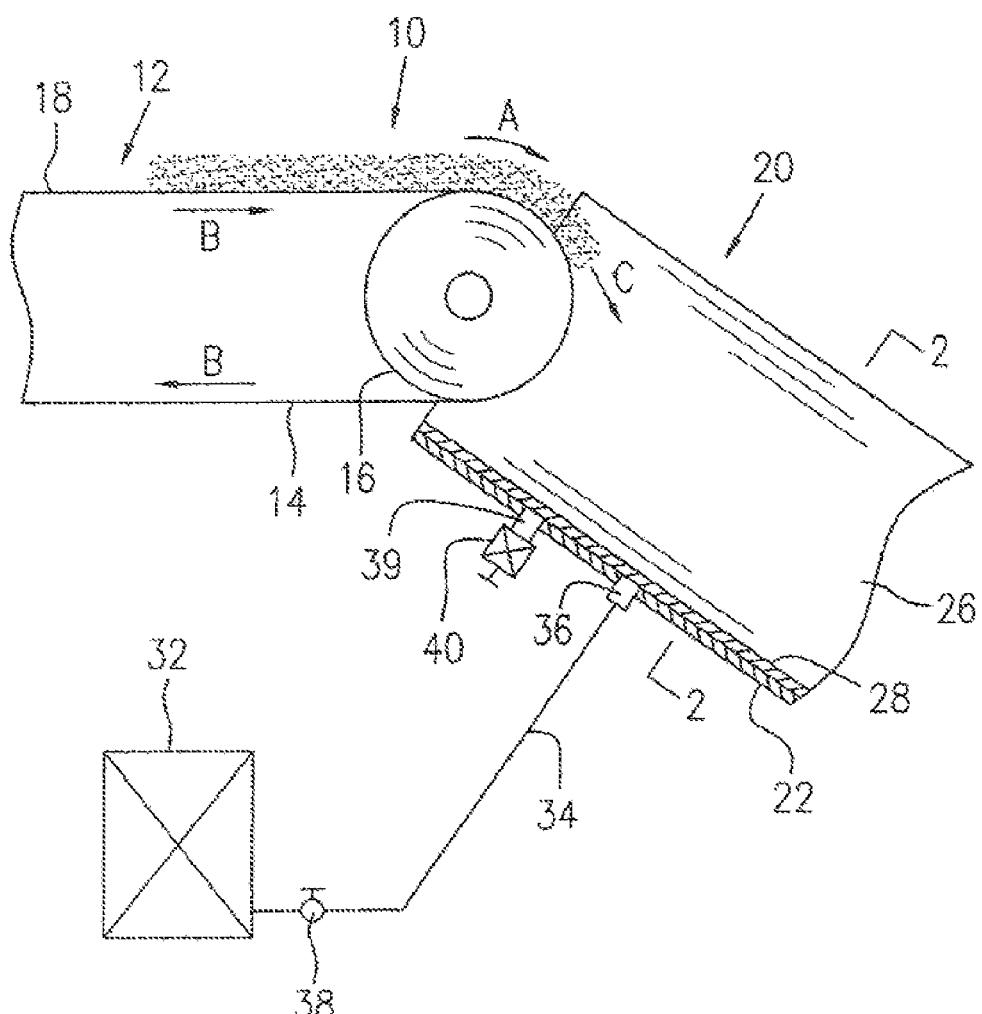
FIG. 1 is a schematic side elevational view of a granular material handling system including a typical belt conveyor and a transfer chute.

FIG. 1 illustrates a granular material handling system 10 in which a belt conveyor 12 has an input end (not shown) and a discharge end 14. Pulley 16 is provided at the respective input and discharge ends. The pulley 16 at either of the input or discharge ends may be driven and the rotational direction of the pulley 16 is indicated by arrow A. A conveyor belt 18 including a material-bearing run and a return run (respective top and bottom runs), engages the pulley 16 at the both input and discharge ends. The belt 18 moves in the direction indicated by the arrow B. The length of the conveyor 12 is determined by the requirements of the application.

A transfer chute 20 is provided at the discharge end 14 of the belt conveyor 12 to transfer the granular material (not indicated) such as bauxite solids, delivered by the belt conveyor 12 and discharged into the transfer chute 20, to a storage pile or other destination. The direction of movement of the granular material from the belt conveyor 12 into the transfer chute 20 is indicated by arrow C.

Figure 2:
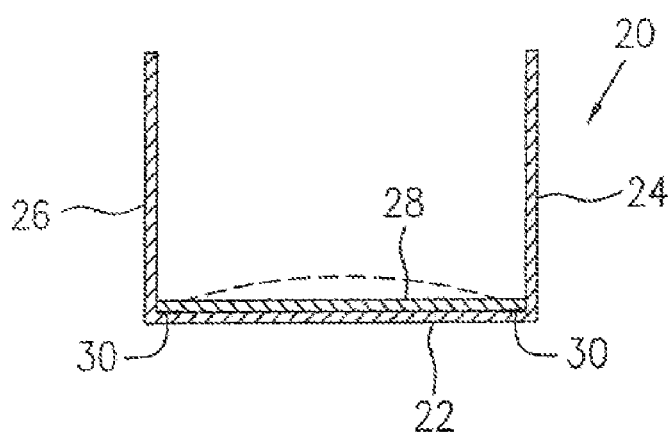
FIG. 2 is a cross-sectional view taken along line 2-2, showing a cross-section of the transfer chute.

In FIGS. 1 and 2, the transfer chute 20 is shown as having an open cross-section or a pipe-type closed cross-section (not shown), defining at least one chute wall. As one example of a transfer chute, chute 20 includes a bottom chute wall 22 and side chute walls 24, 26 at opposite sides thereof, respectively, forming a channel to direct a flow of the granular material sliding under the force of gravity along the chute 20. The chute walls 22, 24 and 26 may be made of any suitable material, for example, metal plates such as steel plates. A deformable/inflatable wear liner 28 is provided within the chute 20 in order to protect the metal walls from wearing, abrasion and corrosion. The deformable/inflatable wear liner 28 is attached to at least a section of at least one of the chute walls. It is understood that the liner could be provided only on selected areas of inner surfaces of the chute walls or alternatively, it could be provided on the entire inner surfaces of the chute walls 22, 24 and 26. As an example of the present invention illustrated in FIGS. 1 and 2, the liner 28 is attached to the chute wall 22 of the chute 20.

The deformable/inflatable wear liner 28 can be attached along its periphery to an inner surface of a section of the chute wall 22 so as to allow pressurized air to be introduced into a chamber or space (see FIG. 5) between the deformable/inflatable wear liner 28 and the chute wall 22 in order to inflate the wear liner 28. The inflated state of the deformable/inflatable wear liner 28 as shown by the broken lines in FIG. 2, changes the profile of the cross-section of the channel defined by the chute walls 22, 24, 26. The deformable/inflatable wear liner 23 offers a wear-resistant surface at a side exposed to the granular material. The attachment of the deformable/inflatable wear liner 28 to an inner surface of a section of the chute wall 22 may be achieved by a layer of adhesive 30 applied along the peripheral edges of the wear liner 28 between the wear liner 28 and the chute wall 22.

Pressurized air may be obtained from a pressurized air source 32 which may be a pressurized air tank or a blower/low pressure air pump, or the like, and is delivered through a tube 34 which is connected at the other end thereof to an opening 36 defined in the chute wall 22. A switch device such as a control valve 38 may be installed in the tube 24 to control the introduction and termination of pressurized air flow into the space between the deformable/inflatable wear liner 28 and the chute wall 22. The control valve 38 may optionally also have a function of controllably discharging the pressurized air from the space between the deformable/inflatable wear liner 28 and the chute wall 22 when the control valve 38 is turned to a position for terminating pressurized air flow from the pressurized air source 32 to the chute 20. Otherwise, an additional discharging valve may be provided (not shown) with the tube 34. If the pressurized air source is a blower/low pressure pump, the control valve 38 may also be replaced by a switch for controlling the operation of the blower/low pressure pump. A maximum pressure safety valve 40 may be provided to ensure that the pressure of the pressurized air introduced to the place between the deformable/inflatable wear liner 23 and the chute wall 22 is not over a predetermined level. The maximum pressure safety valve 40 may be incorporated to the tube 34 or mounted directly to another opening 39 defined in the chute wall 22.

In FIGS. 1-5, the deformable/inflatable wear liner 28 includes at least one flexible plate, such as an elastomer polymer substrate 42 with a plurality of side-by-side wear-resistant tiles, such as ceramic tiles 44, embedded into one side of substrate 42. In accordance with one embodiment of the present invention, one of these materials commercially available for such applications is a "poly ceramic sheet", for example a "Concord Poly Ceramic Sheet™", which is a sheet made of elastomeric polymer provided with ceramic tiles on one side thereof. The tiles 44 could also be glued or otherwise securely attached to the substrate 42. The poly ceramic sheet is highly flexible and is suitable to be deformed for inflation in this application. One or more poly ceramic sheets may be used to form the deformable/inflatable wear liner 28, and may be bonded or otherwise suitably attached to the underlying section of the chute wall 22 by using, for example, standard rubber adhesives as indicated by numeral 30 in FIG. 2. The ceramic tiles 44 on the elastomeric sheet or substrate 42 function as the wear-resistant surface of the wear liner 28 while the flexibility of the elastomer sheet provides the deformable/inflatable feature of the wear liner 28 so as to allow creation of a liner surface which can be disturbed by inflation and deflation on a regular basis to prevent solids from building up within the transfer chute 20.

Figure 5:
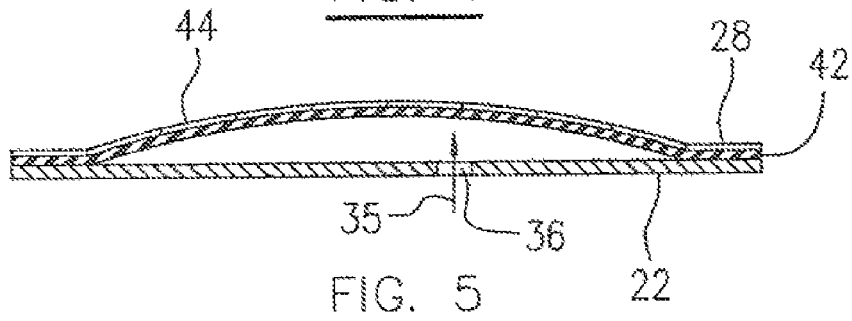
FIG. 5 is a similar view to that of FIG. 4, showing an inflated state of the poly ceramic sheet of FIG. 3 attached to the section of the chute wall as the chute wear liner.

In operation, pressurized air flow may be introduced from the pressurized air source 22 through the tube 34 into the space between the deformable/inflatable wear liner 28 and the chute wall 22 such that the deformable/inflatable wear liner 28 is inflated as shown in FIG. 5 and by the broken line in FIG. 2. The arrow indicated by numeral 35 in FIG. 5 is used to illustrate the pressurized air flow to inflate the wear liner 28. The wear liner 28 in the inflated state may be further disturbed/deformed by the moving loads of the granular materials to which the deformable/inflatable wear liner is exposed to support same within the chute 20.

Figure 4:
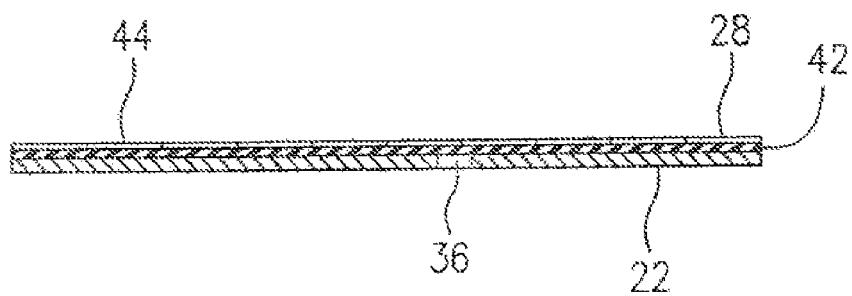
FIG. 4 is a partial cross-sectional view of the transfer chute of FIG. 1, illustrating an original state of the poly ceramic sheet of FIG. 3 attached to a section of a chute wall as a chute wear liner.

After a period of time the introduction of the pressurized air flow is terminated and the pressurized air is allowed to discharge from the space between the deformable/inflatable wear liner 28 in the inflated state and the chute wall 22, by, for example operating the control valve 38. As a result of discharging the pressurized air, the deformable/inflatable wear liner 28 is allowed to return to the original state, as shown in FIGS. 1 and 4, causing a profile recovery of the cross-section of the channel defined by the chute walls 22, 24 and 26, as shown in FIG. 2. During periods of time when the deformable/inflatable wear liner 28 extends on the underlying chute wall 22 without being deformed/inflated, the deformable/inflatable wear liner 28 functions similarly to a conventional chute liner.

The steps of inflating and discharging pressurized air from the deformable/inflatable wear liner 28 may be repeated periodically. According to one embodiment of the present invention, the operation can be conducted with air-on (inflation) for a relatively short period of time, for example twenty seconds and then air-off (after discharging pressurized air) for a relatively long period of time, for example 1 hour, on an alternating basis at a low operating air pressure, for example 3 psi. The maximum pressure safety valve 40 will be adjusted accordingly. According to another example, the system is operated under a 7 second inflation/3 minutes deflation cycle. The deflation time can vary depending on the material sticking to the tiles, the quicker the material stick, the shorter the time between inflation and deflation.

Figure 3:
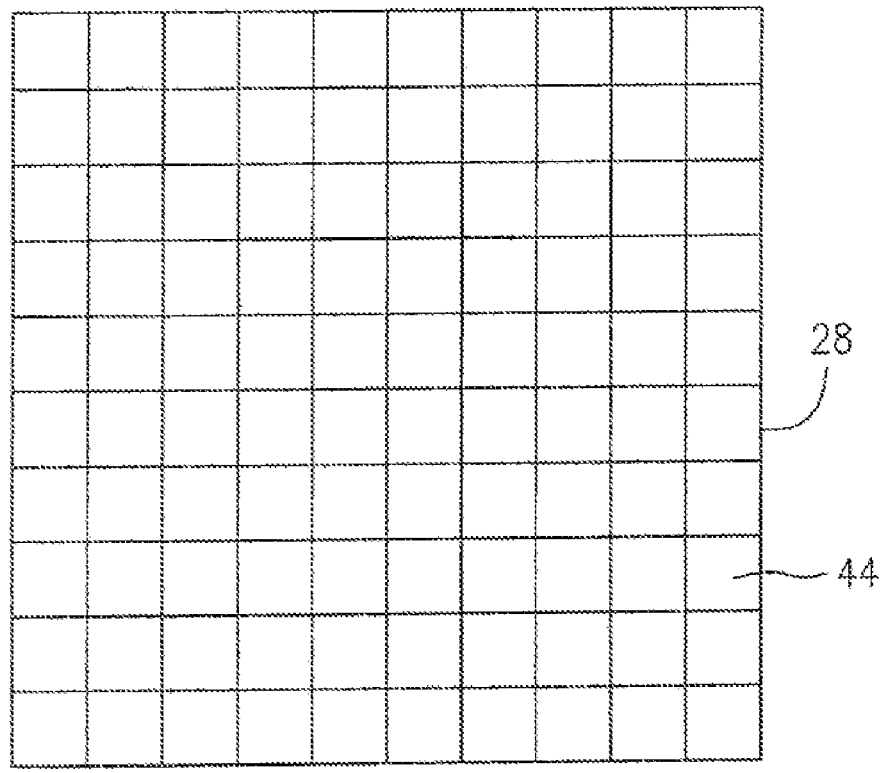
FIG. 3 is a top plane view of a poly ceramic sheet used to form a chute wear liner in the granular material handling system illustrated in FIG. 1.
Figure 6:
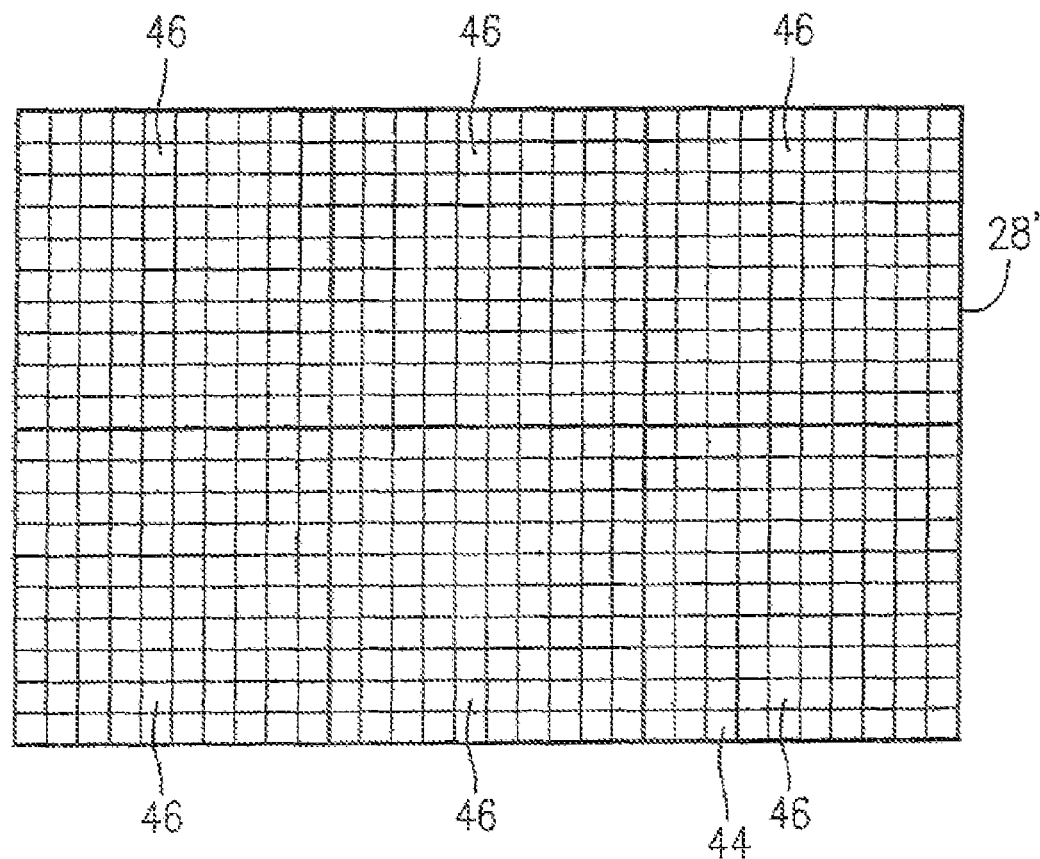
FIG. 6 is a top plane view of a multiple segmented wear liner.
Figure 7:
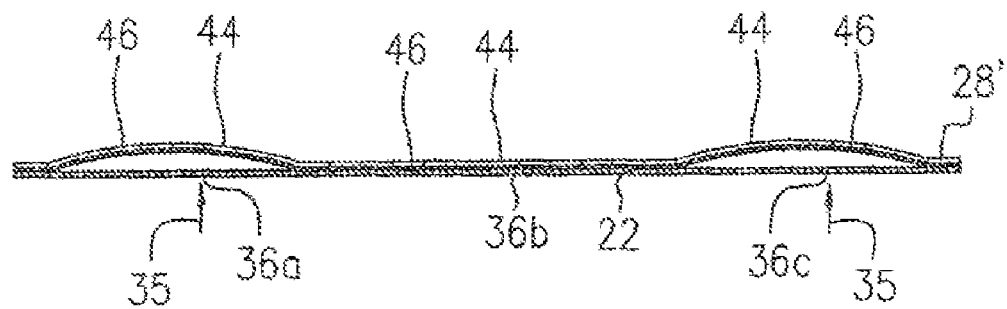
FIG. 7 is partial cross-sectional view of the transfer chute of FIG. 1, showing a deformable/inflatable wear liner made of the multiple segmented liner of FIG. 6.

FIGS. 1-2 and 6-7 illustrate another embodiment in which one or more multiple segmented poly ceramic sheets may be used as the deformable/inflatable wear liner which is indicated as 28' in FIGS. 6 and 7. The multiple segmented deformable/inflatable wear liner 28' includes a plurality of segments 46 (6 segments shown in FIG. 6), each segment being similar to a single poly ceramic sheet forming the deformable/inflatable wear liner 28 as shown in FIGS. 3-5, and will not be redundantly described herein.

The multiple segmented deformable/inflatable wear liner 28' may be attached to any section or an entire area of the inner surface of the chute walls 22, 24 and 26. For convenience of description, the multiple segmented deformable/inflatable wear liner 28' is illustrated as being attached to a section of the chute wall 22 of the transfer chute 20, similar to the previously described embodiment. The multiple segmented deformable/inflatable wear liner 28' is attached to the section of chute wall 22 by using an adhesive (not shown) such as the standard rubber adhesives between the liner 28' and the chute wall 22 along the peripheral edges of each segment such that each segment may be inflatable independently from others, as shown in FIG. 7, in which two air chambers are formed behind two respective segments 46 of the wear liner 28' at opposite sides thereof by charging pressurized air (indicated by arrow 35) into the space between the corresponding segments 46 and the chute wall 22, through respective openings 36a and 36c in the chute wall 22 while the middle segment 46 of the wear liner 28' remains in the original state (not inflated or deformed) because no pressurized air is charged into the space between this segment 46 and the chute wall 22 through the opening 36b in the chute wall 22.

In operation of a multiple segmented deformable/inflatable wear liner 28' each of the segments 46 of the deformable/inflatable wear liner 28' may be alternately air-charged and air-discharged to achieve the independent inflation of the respective segments of the deformable/inflatable wear liner 28'. This may be achieved by a pressurized air system having a plurality of flow-controllable tubes 34 leading to multiple openings such as 36a-36c. The periodic air-charging and air-discharging operations of the respective segments 46 of the multiple segmented wear liner 28' may be conducted independently, for example, on a rotating basis. Alternatively, the periodic air-charging and air-discharging operations for the respective segments of the multiple segmented wear liner 28' may be conducted simultaneously. In the latter case, a single tube 34 with a single switch device may be used to connect a multiple-way fluid connector which is in turn connected to respective openings such as 36a-36c in the chute wall 22.

According to one embodiment, the system is arranged in two separate sections inflated alternately. This embodiment is particularly useful for use in a stacker chute, which is one possible application of the present invention. In this particular case, the two sections are the lower chute and the baffle. The discharge of the chute is relatively small and tends to block very easily. So for this reason, it is advantageous to inflate the lower chute section to remove any build up, and then inflate the upper section including the baffle. This minimizes the chances of excess build up blocking the chute. By so alternating the inflation between separate sections, it is also possible to operate more liners from a smaller compressor. The alternating of the inflation between separate inflatable sections or zones also provides for the use of different inflatable wear plate sizes. By connecting one inflatable wear plate size to one valve at a given inflation time, a given overall pressure is obtained. Then, by connecting a different inflatable wear plate size to another valve at a different time interval, a different overall pressure is obtained. Different inflatable wear plate sizes require different pressures to inflate them and as such if only one air pressure source is used, the different sizes wear plates must be inflated at different time intervals to provide for proper operation of the system.

Alternative to the above-described embodiments, the deformable/inflatable wear liner may be made from a flexible sheet having two layers to form an inflatable pocket defined therebetween.

The above-description is meant to be exemplary only, and one skilled in the art will recognize that changes may be made to the embodiments described without departing from the scope of the invention disclosed. For example, the underlying section of the chute wall to support the deformable/inflatable wear liner is described and illustrated as a flat steel plate, but the deformable/inflatable wear liner may be attached to any section or an entire area of the inner surface of other types of chutes which are not flat and are made of any suitable material known and unknown in the industry. The pressurized air systems described in the above-embodiments are used as an example to illustrate the operation of the deformable/inflatable wear liners. Various pressurized air equipment and systems may be used for the same purpose. Bauxite solids are used as an example of the granular materials which the transfer chute bears and delivers. However, it is understood that the deformable/inflatable wear liners can be used in any similar granular material handling system for handling a variety of granular material such as granular coal, aggregate, or other mining material which is within a given granule size range. Still other modifications which fall within the scope of the invention will be apparent to those skilled in the art in light of a review of this disclosure, and such modifications are intended to fall within the appended claims.

I claim:

1. A method for preventing solids from building up in a granular material delivery passage during a material delivery operation, the passage including at least a wall and a deformable wear liner provided on an inner surface of the wall for directing granular materials sliding on the wear liner, the method comprising: a) introducing a pressurized fluid flow into a space between the inner surface of the wall and the deformable wear liner to deform the wear liner, thereby causing a profile change of a cross-section of the granular material delivery passage.

2. The method as defined in claim 1 further comprising: b) releasing fluid pressure from the space between the inner surface of the wall and the deformable wear liner in order to allow the deformed wear liner to return to an original state, resulting in a profile recovery of the cross-section of the granular material delivery passage.

3. The method as defined in claim 2 wherein steps a) and b) are repeated during the material delivery operation.

4. The method as defined in claim 2 wherein steps a) and b) are conducted in alternating periods of time, the period of time for step a) being smaller than the period of time for step b).

5. The method as defined in claim 4 wherein steps a) and b) are conducted alternately in each of a plurality of segments of the deformable wear liner to allow each segment of the deformable wear liner to be repeatedly deformed and to return to the original state.

6. The method as defined in claim 5 wherein alternately repeating steps a) and b) in the respective segments of the deformable wear liner, is conducted simultaneously.

7. The method as defined in claim 5 wherein alternately repeating steps a) and b) in the respective segments of the deformable wear liner, is conducted on a rotating basis.

8. A chute for a material handling system bearing granular materials, the chute comprising:
at least one wall;
a deformable wear liner having a wear-resistant surface, the deformable wear liner being attached to at least a section of the wall so as to allow pressurized fluid to be introduced into a space between the deformable wear liner and the wall in order to inflate the deformable wear liner; and
means for introducing and discharging pressurized fluid into and from the space between the deformable wear liner and the wall, respectively.

9. The chute as defined in claim 8 wherein the wall is of a metal material and the section of the wall is substantially flat.

10. The chute as defined in claim 8 wherein the deformable wear liner comprises at least one flexible substrate with a plurality of side-by-side wear-resistant tiles embedded in one side of the substrate.

11. The chute as defined in claim 8 wherein the deformable wear liner comprises at least one poly ceramic sheet which includes an elastomer substrate with a plurality of ceramic tiles fixed to a side of the elastomer substrate.

12. The chute as defined in claim 11 wherein the at least one poly ceramic sheet is bonded at a peripheral edge to the wall by an adhesive.

13. The chute as defined in claim 8 wherein the deformable wear liner comprises a plurality of poly ceramic sheets, each of the poly ceramic sheets being bonded at peripheral edges thereof to the wall in order to form a plurality of segments of the deformable wear liner, each segment being inflatable independently.

14. The chute as defined in claim 8 wherein the means comprises at least one opening extending through the section of the wall to allow pressurized fluid to be controllably introduced and discharged into and from the space between the deformable wear liner and the wall, respectively.

15. The chute as defined in claim 14 comprising means attached to the section of the wall for limiting a pressure of the pressurized fluid to a predetermined level.

16. The chute as defined in claim 13 wherein the means comprises a plurality of openings extending through the section of the wall, each opening being in communication with a space between the wall and one of the segments of the deformable wear liner.

17. A granular material handling system comprising:
a chute including a chute wall and a deformable wear liner within the chute, the deformable wear liner being attached to an inner surface of a section of the chute wall so as to allow pressurized air to be introduced into a space between the wear liner and the chute wall in order to inflate the wear liner;
a source of pressurized air;
a tube connected between the source of pressurized air and the space between the chute wall and the wear liner for delivery of pressurized air to inflate the wear liner; and
a control apparatus for controllably inflating the wear liner and discharging pressurized air from the space between the chute wall and the wear liner, respectively.

18. The system as defined in claim 17 wherein the apparatus comprises a switch device for alternately allowing and terminating a pressurized air flow from the source of pressurized air to the space between the chute wall and the wear liner.

19. The system as defined in claim 18 wherein the apparatus comprises a valve for selectively discharging pressurized air from the space between the chute wall and the wear liner.

* * * * *